July 27, 1948.  W. STURGESS  2,445,929
PROJECTOR SLIDE VIEWER
Filed April 7, 1947  2 Sheets-Sheet 1
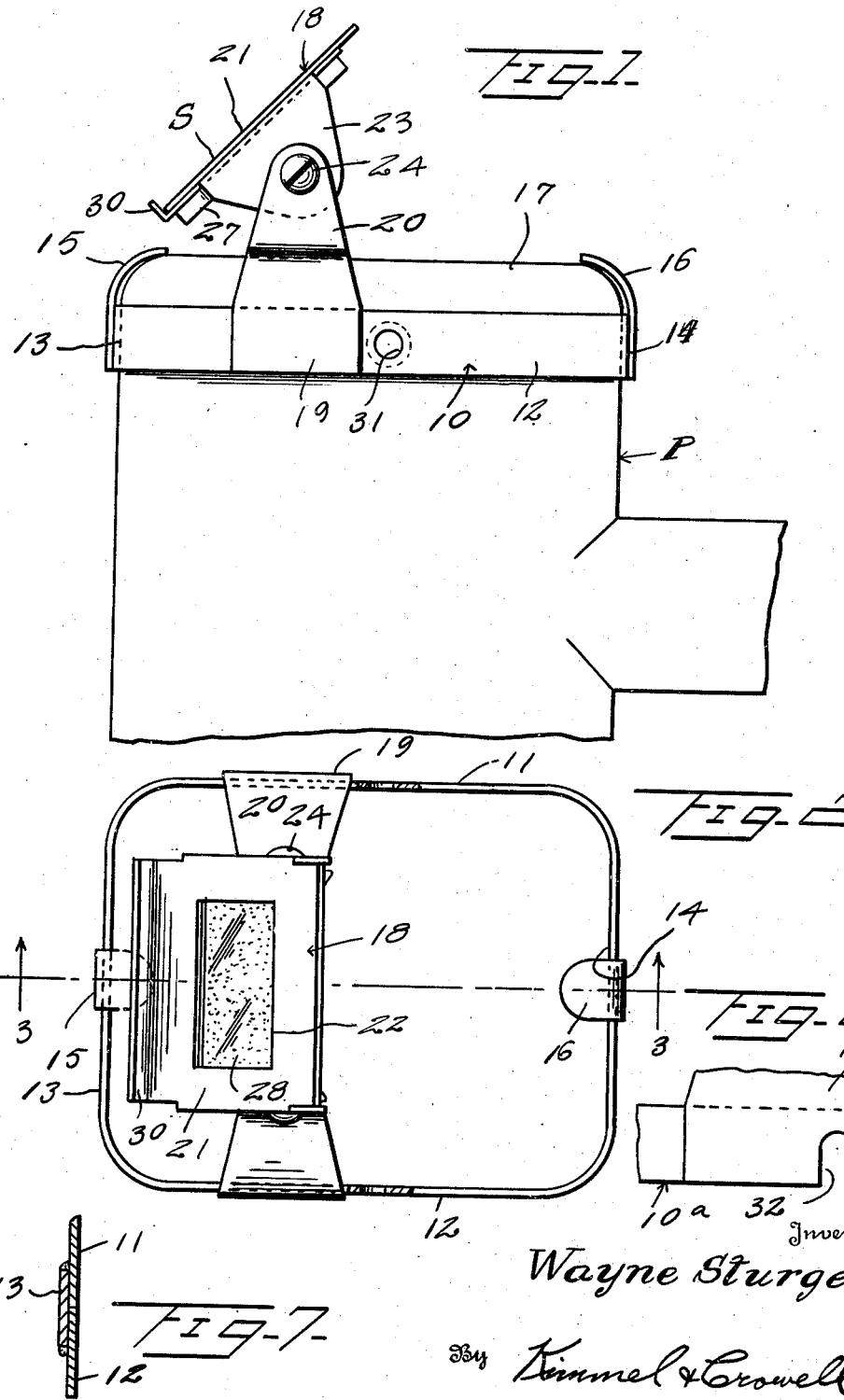
Inventor
Wayne Sturgess
By Kimmel & Crowell
Attorneys

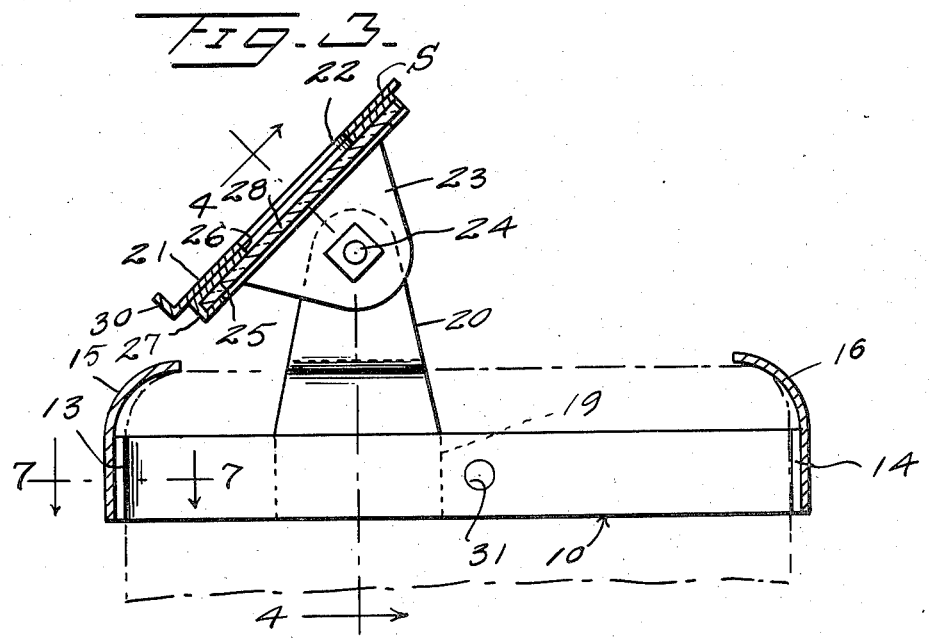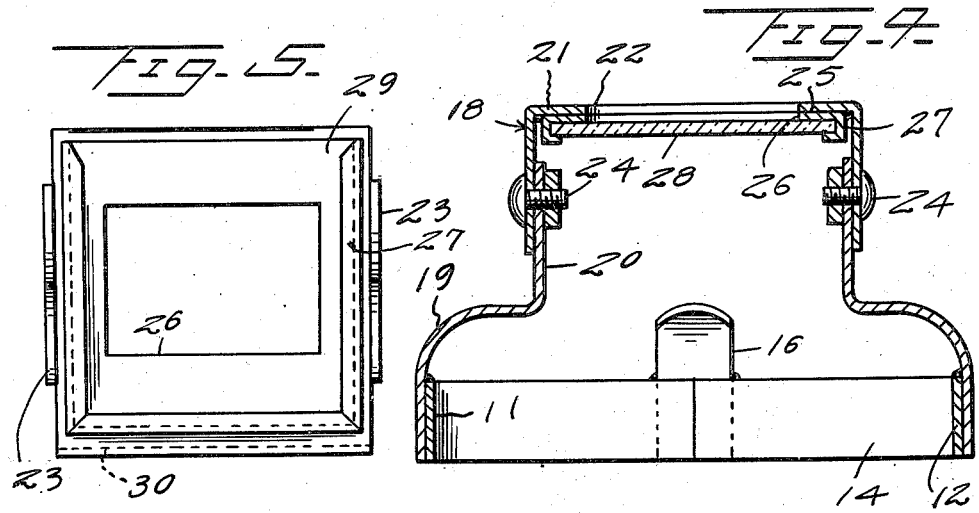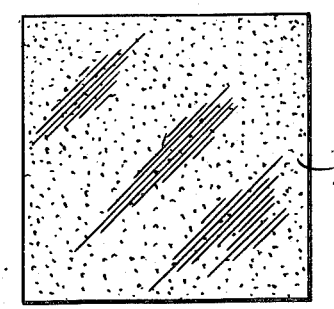

Patented July 27, 1948

2,445,929

UNITED STATES PATENT OFFICE 2,445,929

PROJECTOR SLIDE VIEWER

Wayne Sturgess, Salem, Oreg.

Application April 7, 1947, Serial No. 739,820

3 Claims. (Cl. 88—26)

This invention relates to picture projectors of the slide type, and more particularly to an attachment for the projector whereby the slide may be pre-viewed.

An object of this invention is to provide a slide viewing attachment for a picture projector which is adapted to be mounted on the projector where there is a spill of light, the attachment including a bracket or holder for a slide and a light diffusing panel so that the operator will be able to determine which is the right side of the slide and which edge is the top of the slide before inserting the slide in the projector.

Another object of this invention is to provide an attachment of this kind which can be adapted to various types of projectors, and the slide holder can be readily adjusted for viewing from either a sitting or standing position.

A further object of this invention is to provide an attachment of this kind which is of simple construction so that it can be made at small cost.

With the above and other objects in view, my invention consists in the arrangement, combination and details of construction disclosed in the drawings and specification, and then more particularly pointed out in the appended claims.

In the drawings,

Figure 1 is a detail side elevation of a slide preview attachment for projectors constructed according to an embodiment of this invention, Figure 2 is a plan view of the device, Figure 3 is a sectional view taken on the line 3—3 of Figure 2, Figure 4 is a sectional view taken on the line 4—4 of Figure 3, Figure 5 is a rear elevation of the slide support removed from the device, Figure 6 is a plan view of the light diffusing plate, Figure 7 is a fragmentary sectional view taken on the line 7—7 of Figure 3, Figure 8 is a fragmentary side elevation of a modified form of supporting base.

Referring to the drawings, the numeral 10 designates generally a base which is of rectangular configuration in plan and is formed of opposed U-shaped members 11 and 12. The bights of the U-shaped members 11 and 12 are substantially longer than the opposite parallel legs thereof and the free ends of the legs of the U-shaped members 12 are disposed in confronting position and are secured together by means of a pair of straps 13 and 14.

The straps 13 and 14 extend upwardly above the base or frame 10 being formed with upwardly and inwardly curved fingers 15 and 16 respectively, which are adapted to engage over the upper rounded end 17 of a conventional projector generally designated as P. The projector P normally has a spill of light at its upper end and in order to provide for utilizing this light for previewing slides which are inserted in the projector P, I have provided a holder, generally designated as 18, which is rockably mounted on the base frame 10, or which may be fixed.

The base frame 10 is formed with a pair of upwardly extending arms 19 adjacent the forward end thereof, which have inwardly offset ears 20 formed integral therewith. The holder 18 includes a plate 21 which is formed with a rectangular opening 22 and a pair of ears 23 are bent downwardly and at right angles from the plate 21 and are pivotally secured by means of bolts 24 to the ears 20.

The holder 18 also includes a transparent panel support which is formed of one plate 25, having an opening 26 registering with the opening 22, and at least three marginal edges of the plate 25 are formed with L-shaped flanges 27 within which a light diffusing panel 28 is adapted to removably engage. By forming the L-shaped flanges 27 around three sides of the plate 25, there is formed an entrance mouth 29 through which the panel 28 may be inserted.

The lower edge of the outer plate 21 is formed with a right angle flange 30 forming a seat or ledge on which a slide S is adapted to rest. The base frame 10 is formed with a pair of oppositely disposed openings 31 in the bights of the U-shaped members 11 and 12 thereof, for receiving fastening means to secure the device on top of the projector P. As shown in Figure 8, the base 10a may be formed with a downwardly opening slot 32 in the bights of the U-shaped members thereof, and as here shown, the slot 32 also extends through the lower portions of the supporting arms 19a.

In the use and operation of this device, the frame 10 is inserted in a partially telescoping position over the upper end of the projector P with the inwardly extending fingers 15 and 16 engaging the upper end of the projector to limit the downward movement of the frame 10. The slide holder or support 18 is adjusted to the desired angle so that light rays from the spill of light at the upper end of the projector P will pass through the light diffusing panel 28. The slide which is to be viewed is placed on the outer plate 21 with the lower edge of the slide resting on the supporting flange 30. The slide can then be viewed so as to determine the correct position of the image of the slide in order that the slide can be inserted in the projector in the right position.

This device will permit the operator of the projector to accurately determine the top and bottom edges of the slide before inserting the slide in the projector so that when the slide is inserted in the projector the image will appear in its proper position on the screen.

It will be apparent that the light spill need not necessarily be from the top of the projector, but may come from some other portion thereof and the attachment herein described suitably otherwise positioned. It will also be understood that the frame need not be rectangular but may be of other suitable configuration, and that the device may be permanently attached to the projector.

I do not mean to confine myself to the exact details of construction herein disclosed, but claim all variations falling within the purview of the appended claims.

What I claim is:

1. A slide viewing attachment for a slide projector having an upwardly directed spill of light, comprising a frame for engagement about the outer side of the projector, means carried by said frame for limiting the downward movement of said frame, a pair of upwardly extending arms fixedly carried by said frame, a slide holder, and means pivotally securing said holder to said arms above the spill of light.

2. A slide viewing attachment for a slide projector having an upwardly directed spill of light comprising a frame for engagement about the outer side of the projector, upwardly extending inwardly directed fingers carried by said frame for limiting the downward movement of said frame, a pair of upwardly extending arms fixed to said frame, and a slide holder rockably secured between said arms and over the spill of light, said holder including a light diffusing panel.

3. A slide viewing attachment for a slide projector having an upwardly directed spill of light comprising a frame, means supporting said frame on said projector, a pair of upwardly directed arms fixed to said frame, a slide holder for positioning above the spill of light, dependent arms carried by said holder, and means pivotally securing said dependent arms to said first named arms.

WAYNE STURGESS.

REFERENCES CITED

The following references are of record in the file of this patent:

UNITED STATES PATENTS

| Number | Name | Date |
|---|---|---|
| 1,242,674 | Fleischer | Oct. 9, 1917 |
| 1,561,910 | Cheaney | Nov. 17, 1925 |
| 2,313,737 | Sherbinin | Mar. 16, 1943 |

FOREIGN PATENTS

| Number | Country | Date |
|---|---|---|
| 470,120 | Great Britain | Aug. 10, 1937 |